(12) United States Patent
Liu et al.

(10) Patent No.: US 10,936,844 B2
(45) Date of Patent: Mar. 2, 2021

(54) FINGERPRINT SENSOR, DISPLAY APPARATUS, METHOD OF DETECTING A FINGERPRINT, AND METHOD OF FABRICATING A FINGERPRINT SENSOR

(71) Applicants: BEIJING BOE OPTOELECTRONICS TECHNOLOGY CO., LTD., Beijing (CN); BOE Technology Group Co., Ltd., Beijing (CN)

(72) Inventors: Yu Liu, Beijing (CN); Liguang Deng, Beijing (CN); Ming Zhai, Beijing (CN); Xiaoliang Fu, Beijing (CN); Shuqian Dou, Beijing (CN); Yawen Zhang, Beijing (CN); Ting Tian, Beijing (CN); Zhiqiang Fan, Beijing (CN); Dayong Zhou, Beijing (CN); Dong Zhang, Beijing (CN); Youcai Yang, Beijing (CN); Yongjie Han, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 55 days.

(21) Appl. No.: 16/464,600

(22) PCT Filed: Jul. 16, 2018

(86) PCT No.: PCT/CN2018/095800
§ 371 (c)(1),
(2) Date: May 28, 2019

(87) PCT Pub. No.: WO2020/014822
PCT Pub. Date: Jan. 23, 2020

(65) Prior Publication Data
US 2020/0327295 A1    Oct. 15, 2020

(51) Int. Cl.
*G06K 9/00*      (2006.01)
*H04M 1/02*      (2006.01)

(52) U.S. Cl.
CPC ........ *G06K 9/0004* (2013.01); *H04M 1/0266* (2013.01)

(58) Field of Classification Search
CPC .......... G06K 9/0004; G06K 9/00006–9/0012; H04M 1/0266
See application file for complete search history.

(56) References Cited

U.S. PATENT DOCUMENTS

| | | | | |
|---|---|---|---|---|
| 5,420,948 | A * | 5/1995 | Byron | G02B 6/021 359/573 |
| 2003/0053774 | A1* | 3/2003 | Blomquist | G02F 1/0115 385/123 |

(Continued)

FOREIGN PATENT DOCUMENTS

| | | |
|---|---|---|
| CN | 101285845 A | 10/2008 |
| CN | 103822738 A | 5/2014 |
| CN | 106295488 A | 1/2017 |

OTHER PUBLICATIONS

International Search Report & Written Opinion dated Apr. 1, 2019, regarding PCT/CN2018/095800.

(Continued)

*Primary Examiner* — Stephen G Sherman
(74) *Attorney, Agent, or Firm* — Intellectual Valley Law, P.C.

(57) ABSTRACT

The present application provides a fingerprint sensor. The fingerprint sensor includes an array of a plurality of optical fibers. Each of the plurality of optical fibers has a first end and second end opposite to the first end. Each of the plurality of optical fibers is configured to allow an incident light to enter into the second end and an exit light to exit from the second end. Each of the plurality of optical fibers includes (Continued)

a fiber core; a fiber Bragg grating in the fiber core; and a reflective film on the first end.

17 Claims, 7 Drawing Sheets

(56) References Cited

U.S. PATENT DOCUMENTS

| | | | | |
|---|---|---|---|---|
| 2008/0225297 | A1* | 9/2008 | Hossu | G06K 9/00013 |
| | | | | 356/445 |
| 2013/0101867 | A1* | 4/2013 | Yukinobu | C01F 17/206 |
| | | | | 428/702 |
| 2014/0185131 | A1* | 7/2014 | Dai | H01S 3/06758 |
| | | | | 359/337.1 |
| 2015/0092272 | A1* | 4/2015 | Shinto | G02B 5/285 |
| | | | | 359/578 |
| 2016/0132712 | A1 | 5/2016 | Yang et al. | |
| 2017/0316248 | A1* | 11/2017 | He | G06K 9/036 |
| 2019/0328105 | A1* | 10/2019 | Futawatari | G06K 9/0004 |

OTHER PUBLICATIONS

Research on Mach-Zehnder Optical Fiber Temperature Sensor Based on Twin-core Fiber Grating, Rongjie Hou, Mater's Thesis, Beijing Jiaotong University, p. 44-45, English Translation attached.

* cited by examiner

FINGERPRINT SENSOR, DISPLAY APPARATUS, METHOD OF DETECTING A FINGERPRINT, AND METHOD OF FABRICATING A FINGERPRINT SENSOR

CROSS-REFERENCE TO RELATED APPLICATION

This application is a national stage application under 35 U.S.C. § 371 of International Application No. PCT/CN2018/095800, filed Jul. 16, 2018, the contents of which are incorporated by reference in the entirety.

TECHNICAL FIELD

The present invention relates to the field of sensor technology, more particularly, to a fingerprint sensor, a display apparatus, a method of detecting a fingerprint, and a method of fabricating a fingerprint sensor.

BACKGROUND

In recent years, various methods have been proposed in fingerprint and palm print recognition. Examples of optical method for recognizing fingerprint and palm print include total reflection method, light-path separation method, and scanning method. In a total reflection method, light from a light source such as ambient light enters into a pixel, and is totally reflected on the surface of a package substrate. When a finger or palm touches the display panel, the total reflection condition of the surface changes locally upon touch, leading to a disruption of the total reflection locally. The disruption of the total reflection results in a reduced reflection. Based on this principle, the ridge hues of a finger may be differentiated from the valley lines. Alternatively, fingerprint and palm print may be recognized by detecting changes in capacitance when a finger or a palm touches the display panel.

SUMMARY

In one aspect, the present invention provides a fingerprint sensor comprising an array of a plurality of optical fibers; wherein each of the plurality of optical fibers has a first end and a second end opposite to the first end; and each of the plurality of optical fibers is configured to allow an incident light to enter into the second end and an exit light to exit from the second end, wherein each of the plurality of optical fibers comprises a fiber core; a fiber Bragg grating in the fiber core; and a reflective film on the first end.

Optionally, the fiber Bragg grating is configured to reflect a first portion of an incident light along a direction substantially opposite to a transmission direction of the incident light resulting in a first reflected light having a first reflection wavelength, and allow a second portion of the incident light to pass through the fiber Bragg gating toward the first end as a transmitted light; the reflective film on the first end is configured to reflect the transmitted light along the direction substantially opposite to the transmission direction of the incident light resulting in a second reflected light; and the exit light emitting out from the second end is a compound light comprising the first reflected light and the second reflected light and having a first spectrum distribution.

Optionally, a wavelength of the first reflected light reflected by the fiber Bragg gating shifts from the first reflection wavelength to a second reflection wavelength different from the first reflection wavelength, upon an application of a pressure on the first end; and a spectrum distribution of the compound light emitting out from the second end changes from the first spectrum distribution to a second spectrum distribution different from the first spectrum distribution, upon the application of the pressure on the first end.

Optionally, a plurality of fiber Bragg gratings respectively in the plurality of optical fibers have a substantially uniform nominal pitch when the plurality of fiber Bragg gratings are substantially uncompressed; and light exiting from a plurality of second ends of the plurality of optical fibers have a substantially uniform spectrum distribution when the plurality of fiber Bragg gratings are substantially uncompressed.

Optionally, the fingerprint sensor further comprises an image sensor configured to detect the exit light and generate a spectrum signal.

Optionally, the fingerprint sensor further comprises a comparator configured to compare the spectrum signal with a reference spectrum signal thereby generating a deviation between the spectrum signal and the reference spectrum signal.

Optionally, the fingerprint sensor further comprises a protective layer in direct contact with the first end of each of the plurality of optical fibers.

Optionally, the reflective film comprises at least a first sub-layer and a second sub-layer having different refractive indexes.

Optionally, the first sub-layer comprises hafnium oxide and the second sub-layer comprises silicon oxide.

Optionally, the fingerprint sensor further comprises a light source configured to provide the incident light to each of the plurality of optical fibers from the second end.

Optionally, the fingerprint sensor further comprises a light source; a light collimator configured to collimate light from the light source into substantially collimated light; a circulator configured to uni-directionally transmit collimated light from the light collimator into the plurality of optical fibers; and an image sensor configured to detect light exit from the plurality of optical fibers, which is uni-directionally transmitted by the circulator to the image sensor and generate a spectrum signal.

In another aspect, the present invention provides a display apparatus comprising the fingerprint sensor described herein.

Optionally, the fingerprint sensor further comprises a light source; a light collimator configured to collimate light from the light source into substantially collimated light; a circulator configured to uni-directionally transmit collimated light from the light collimator into the plurality of optical fibers; an image sensor configured to detect light exit from the plurality of optical fibers, which is uni-directionally transmitted by the circulator to the image sensor, and generate a spectrum signal; and a printed circuit configured to transmit the spectrum signal to a driver integrated circuit of the display apparatus.

Optionally, the display apparatus further comprises a cover glass and a display panel attached to the cover glass; wherein the display apparatus has an opening in the cover glass, through which at least a portion of the fingerprint sensor is disposed.

Optionally, the plurality of optical fibers are disposed in the opening for detecting a fingerprint.

Optionally, the display apparatus is a mobile phone.

In another aspect, the present invention provides a method of detecting a fingerprint using a fingerprint sensor comprising an array of a plurality of optical fibers; wherein each of the plurality of optical fibers has a first end and a second end opposite to the first end; and is configured to allow an incident light to enter into the second end and an exit light to exit from the second end; wherein each of the plurality of optical fibers comprises a fiber core; a fiber Bragg grating in the fiber core; and a reflective film on the first end; the method comprising detecting the exit light from the second end of each of the plurality of optical fibers and generating a spectrum signal.

Optionally, prior to detecting the exit light, the method further comprises providing an incident light into each of the plurality of optical fibers; reflecting a first portion of an incident light along a direction substantially opposite to a transmission direction of the incident light thereby generating a first, reflected light having a first reflection wavelength; allowing a second portion of the incident light to pass through the fiber Bragg grating toward the first end as a transmitted light; reflecting the transmitted light along the direction substantially opposite to the transmission direction of the incident light thereby generating a second reflected light; and mixing the first reflected light and the second reflected light thereby generating the exit light having a first spectrum distribution.

Optionally, the method further comprises applying a pressure on the first end of one of the plurality of optical fibers; changing a wavelength of the first reflected light reflected by the fiber Bragg grating from the first reflection wavelength to a second reflection wavelength different from the first reflection wavelength upon applying the pressure on the first end; and changing a spectrum distribution of the exit light emitting out from the second end from the first spectrum distribution to a second spectrum distribution different from the first spectrum distribution, upon applying the pressure on the first end.

Optionally, applying the pressure is performed by a ridge portion of a finger.

Optionally, the method further comprises comparing a spectrum distribution of the exit light with a reference spectrum distribution; and determining a deviation between the spectrum distribution and the reference spectrum distribution.

Optionally, the method further comprises determining a position corresponding to the exit light exiting a first one of the plurality of optical fibers as a ridge line position of a fingerprint upon determining the deviation is in a first range; and determining a position corresponding to the exit light exiting a second one of the plurality of optical fibers as a valley line position of the fingerprint upon determining the deviation is in a second range different from the first range.

Optionally, the reference spectrum distribution is a spectrum distribution of the exit light emitting out from the second end when substantially no external pressure is applied on the first end.

In another aspect, the present invention provides a method of fabricating a fingerprint sensor, comprising forming an array of a plurality of optical fibers, each of which is formed to have a first end and a second end opposite to the first end and configured to allow an incident light to enter into the second end and an exit light to exit from the second end; wherein forming the plurality of optical fibers comprises forming a fiber Bragg grating in a fiber core of each of the plurality of optical fibers; and forming a reflective film on the first end of each of the plurality of optical fibers.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
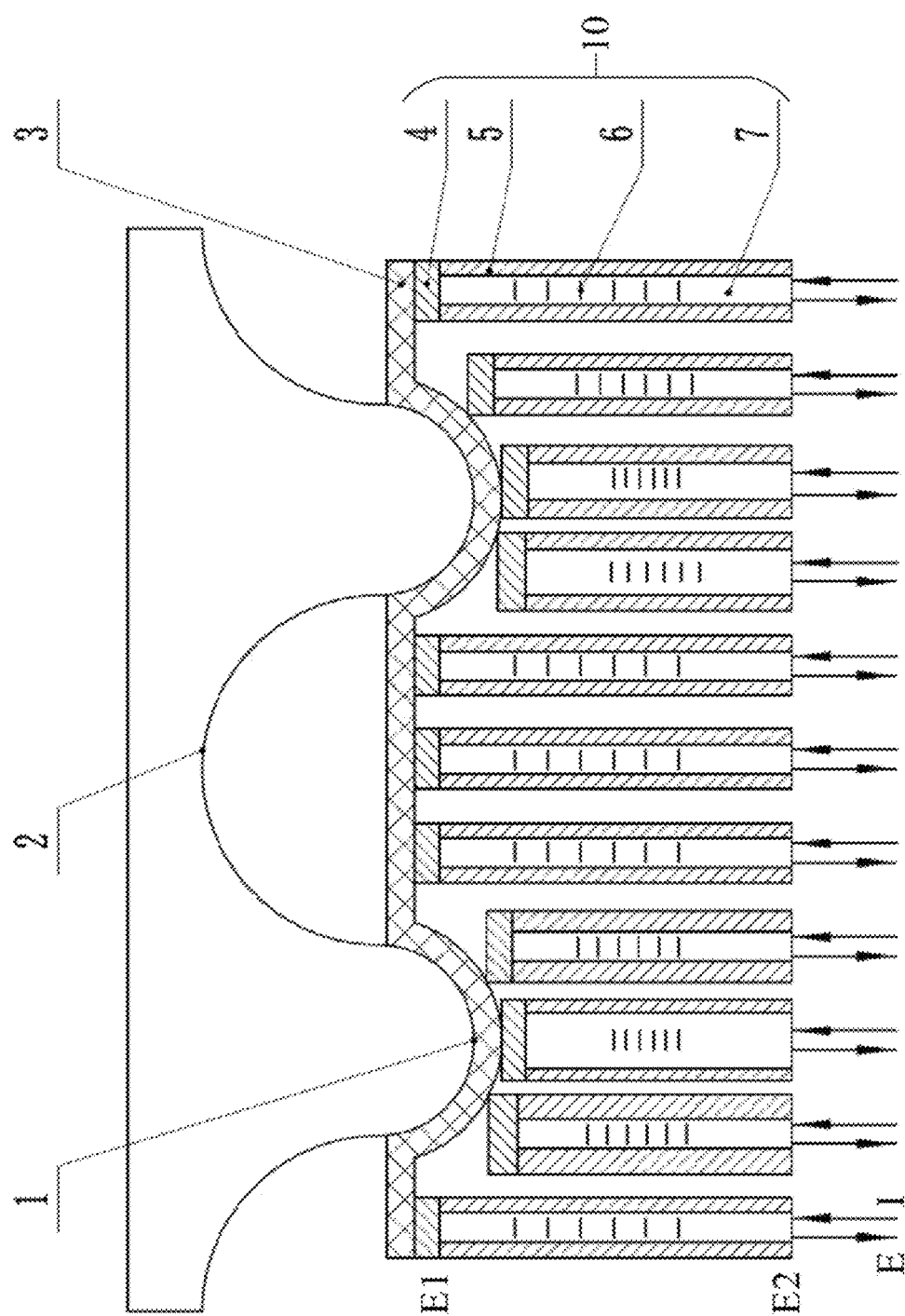
FIG. 1 is a cross-sectional view of a fingerprint sensor in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a fingerprint sensor, a display apparatus, a method of detecting a fingerprint, and a method of fabricating a fingerprint sensor that substantially obviate one or more of the problems due to limitations and disadvantages of the related art. In one aspect, the present disclosure provides a fingerprint sensor. In some embodiments, the fingerprint sensor includes an array of a plurality of optical fibers. Each of the plurality of optical fibers has a first end and a second end opposite to the first end. Each of the plurality of optical fibers is configured to allow an incident light to enter from the second end and an exit light to exit from the second end. In some embodiments, each of the plurality of optical fibers includes a fiber core; a fiber Bragg grating in the fiber core; and a reflective film on the first end. The present fingerprint sensor has ultra-high sensitivity and is not affected by electrostatic charges in the apparatus.

As used herein, the term "fiber Bragg grating" (FBG) refers to a reflector constructed in a segment of optical fiber that reflects particular wavelengths of light and transmits others. The fiber Bragg grating relates to an optical fiber having a periodic variation of the refractive index of the fiber core resulting in a wavelength specific dielectric mirror. The FBG acts as a wavelength-specific reflector having a reflection frequency or wavelength. As the environment to which a FBG is exposed changes, the periodic variation to the refractive index changes causing a shift in the reflection wavelength. The shift may then be correlated to the change in the environment or environmental parameter. Non-limiting examples of the environmental parameter include temperature, pressure, force, strain acceleration, and shape. As used herein, the term "core" relates to a light guiding path within an optical fiber.

The shift in the reflection wavelength may be calculated according to Equation (1):

$$\Delta \lambda_B = 2n_{eff} \Lambda \left( \left\{ 1 - \left( \frac{n_{eff}^2}{2} \right) [P_{12} - v(P_{11} + P_{12})] \right\} \Delta \varepsilon + (\alpha + \xi) \Delta T \right); \quad (1)$$

wherein α stands for a thermal expansion coefficient of a material of the optical fiber; $P_{ii}$ stands for a missile tensor component of the material of the optical fiber; $P_{11}$ and $P_{12}$ are respectively missile tensor components of the material of the optical fiber along different directions; ξ stands for a thermal-optic coefficient of the material of the optical fiber; Δε stands for a strain change; ΔT stands for a temperature change; v stands for a Poisson's ratio of the material of the optical fiber; $\Lambda$ stands for a pitch of the fiber Bragg grating of the optical fiber; and $n_{eff}$ stands for a refractive index of the fiber core with respect to an incident light.

Optionally, the optical fiber is made of a material having a relative small thermal expansion coefficient, e.g., quartz, and the effect of temperature change on the shift in the reflection wavelength is negligible. Accordingly, the Equation (1) can be simplified into Equation (2):

$$\Delta \lambda_B = 2n_{eff} \Lambda \left\{ 1 - \left( \frac{n_{eff}^2}{2} \right) [P_{12} - v(P_{11} + P_{12})] \right\} \Delta \varepsilon. \quad (2)$$

Figure 2:
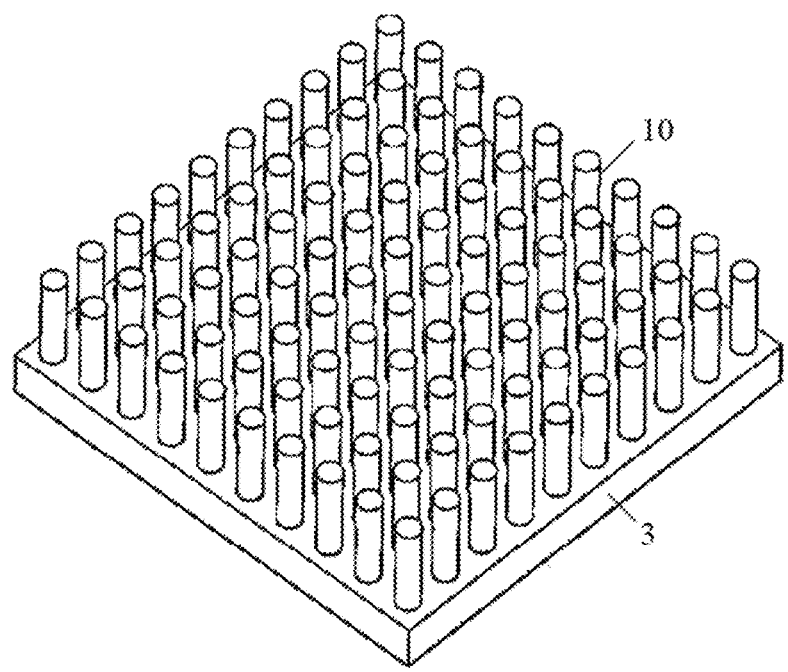
FIG. 2 is a three-dimensional view of a fingerprint sensor in some embodiments according to the present disclosure.

FIG. 1 is a cross-sectional view of a fingerprint sensor in some embodiments according to the present disclosure. FIG. 2 is a three-dimensional view of a fingerprint sensor in some embodiments according to the present disclosure. Referring to FIG. 1 and FIG. 2, the fingerprint sensor in some embodiments includes an array of a plurality of optical fibers 10. The array of the plurality of optical fibers 10 may be disposed on a base substrate, e.g., a flexible base substrate. In FIG. 1 and FIG. 2, the array of the plurality of optical fibers 10 is disposed on a protective layer 3.

Each of the plurality of optical fibers 10 includes a fiber core 7 and a coating 5 wrapped around the fiber core 7. In some embodiments, each of the plurality of optical fibers 10 further includes a fiber Bragg grating 6 in the fiber core 7. The fiber Bragg grating 6 in the fiber core 7 has its refractive index periodically modulated such that an optical signal having multiple wavelengths impinging, thereon is rendered periodically intensified and weakened in refractive index, thereby achieving a periodic refractive index modulation in along the longitudinal direction of the optical fiber. The fiber Bragg grating 6 reflects a portion of an incident light having a specific wavelength corresponding to a predetermined period while passing optical signals having the remaining wavelengths without detecting the periodic changes in refractive index.

In some embodiments, each of the plurality of optical fibers 10 has a first end E1 and a second end E2 opposite to the first end E1. Each the plurality of optical fibers 10 further includes a reflective film 4 on the first end E1. Thus, each of the plurality of optical fibers 10 is configured to allow an incident light I to enter into the second end E2 and an exit light E to exit from the second end E2. As shown in FIG. 1, the reflective film 4 is in direct contact with the fiber core 7 at its end. Optionally, the reflective film 4 is spaced apart from the end of the fiber core 7 with a gap.

Figure 3:
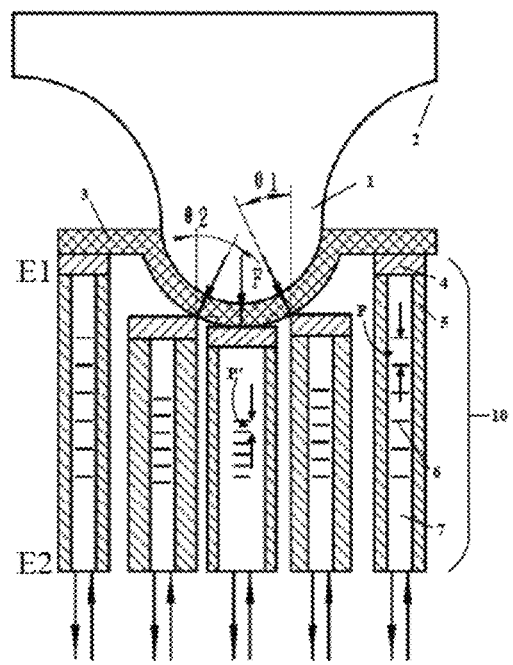
FIG. 3 is a cross-sectional view of a fingerprint sensor in some embodiments according to the present disclosure.

FIG. 3 is a cross-sectional view of a fingerprint sensor in some embodiments according to the present disclosure. Referring to FIG. 1 and FIG. 3, when a finger of a user is placed on the fingerprint sensor, the fingerprint of the finger has a plurality of ridge lines 1 and a plurality of valley lines 2. The valley portion of the fingerprint including the plurality of valley lines 2 is not in contact with the fingerprint sensor. The ridge portion of the fingerprint including the plurality of ridge lines 1 is in direct contact with the fingerprint sensor, e.g., with the protective layer 3. The ridge portion applies a pressure F on one or more of the plurality of optical fibers 10. As shown in FIG. 3, the plurality of optical fibers 10 in a region corresponding to the valley portion are uncompressed. The fiber Bragg grating 6 in the plurality of optical fibers 10 in the uncompressed state has a pitch P. The plurality of optical fibers 10 in a region corresponding to the ridge portion are compressed. The fiber Bragg grating 6 in the plurality of optical fibers 10 in the compressed state has a pitch P' smaller than the pitch P. The greater the pressure F applied on the plurality of optical fibers 10, the more compressed the fiber Bragg grating 6 becomes, and the smaller the pitch P' becomes.

Figure 4:
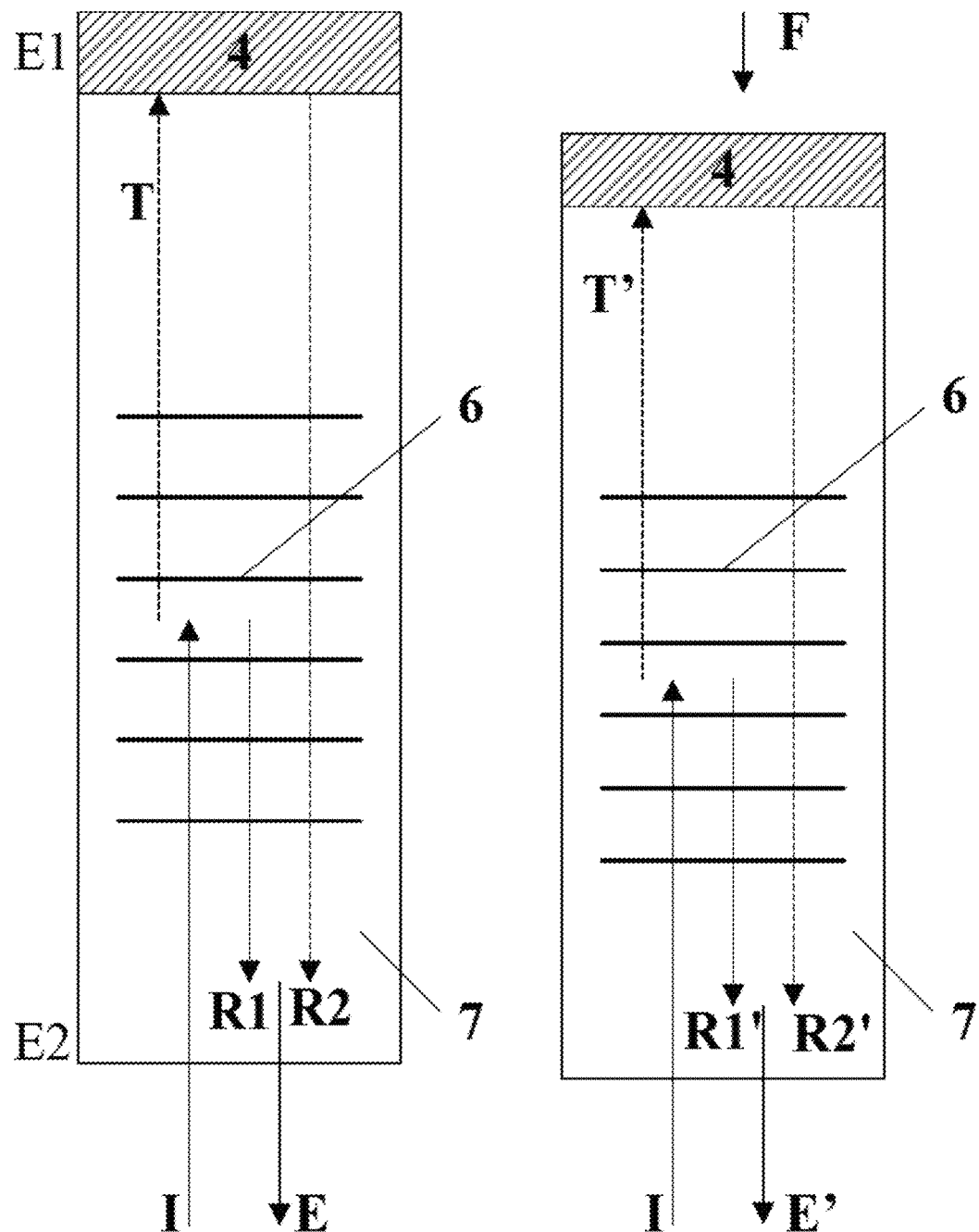
FIG. 4 illustrates an uncompressed state and a compressed state of an optical fiber in a fingerprint sensor in some embodiments according to the present disclosure.
Figure 5:
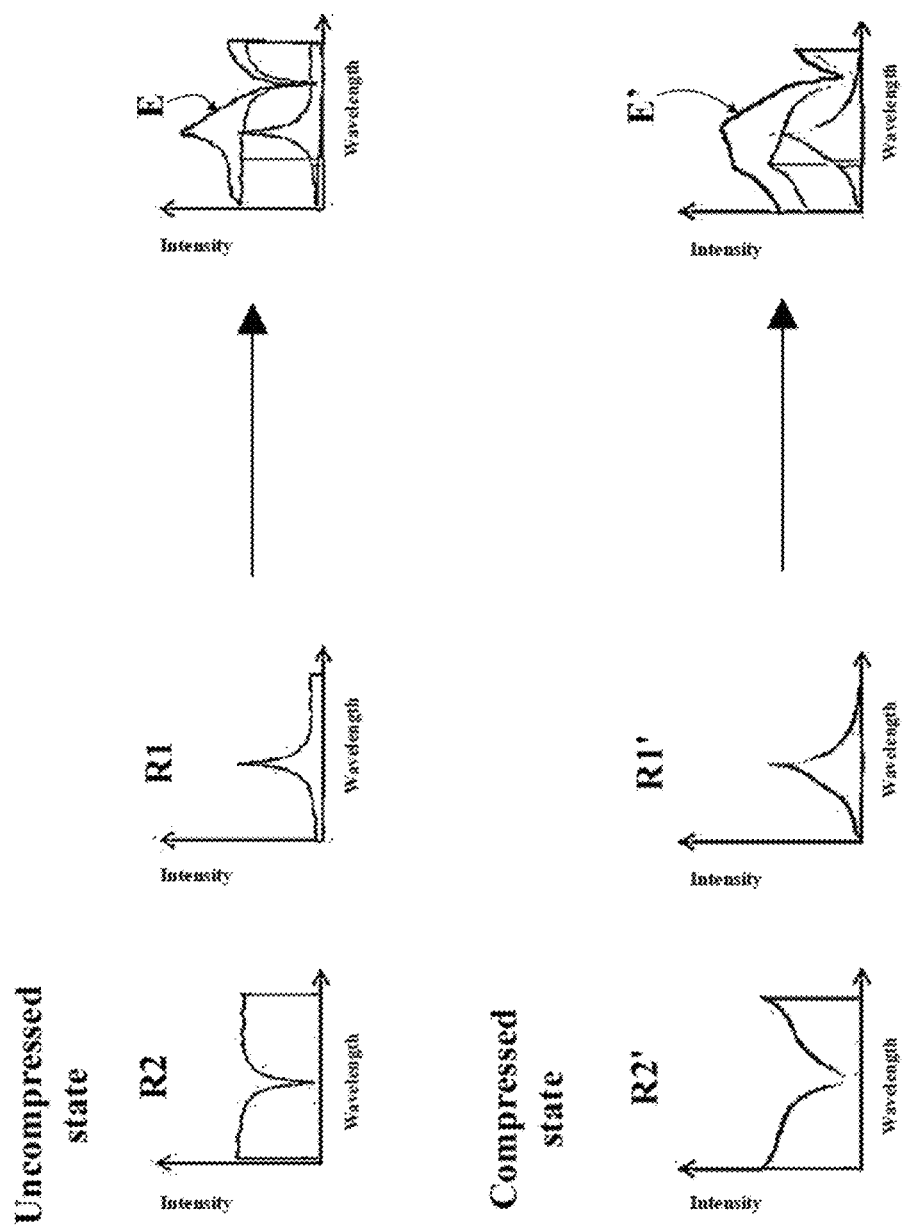
FIG. 5 illustrates spectrum distributions of exit light from an optical fiber respectively in an uncompressed state and a compressed state.

FIG. 4 illustrates an uncompressed state and a compressed state of an optical fiber in a fingerprint sensor in some embodiments according to the present disclosure. FIG. 5 illustrates spectrum distributions of exit light from an optical fiber respectively in an uncompressed state and a compressed state. Referring to FIG. 4, each of the plurality of optical fibers 10 is configured to allow an incident light I to enter into the second end E2 and an exit light E to exit from the second end E2. Referring to FIG. 4 and FIG. 5, in the uncompressed state, the fiber Bragg grating 6 is configured to reflect a first portion of an incident light I along a direction substantially opposite to a transmission direction of the incident light I, resulting in a first reflected light R1 having a first reflection wavelength (see FIG. 5), and allow a second portion of the incident light I to pass through the fiber Bragg grating 6 toward the first end E1 as a transmitted light T. The transmitted light T continues transmitting through the optical fiber along a direction from the second end E2 toward the first end E1 until it reaches the reflective film 4. The reflective film 4 on the first end E1 is configured to reflect the transmitted light T along the direction substantially opposite to the transmission direction of the incident light I resulting in a second reflected light R2. The exit light E is a compound light including the first reflected light R1 and the second reflected light R2 and having a first spectrum distribution (see FIG. 5), and emits out from the second end E2.

Referring to FIG. 4 and FIG. 5, in the compressed state, the fiber Bragg grating 6 is configured to reflect a first portion of an incident light I along a direction substantially opposite to a transmission direction of the incident light I, resulting in a first reflected light R1' having a second reflection wavelength (see FIG. 5), and allow a second portion of the incident light I to pass through the fiber Bragg grating 6 toward the first end E1 as a transmitted light T'. The transmitted light T' continues transmitting through the optical fiber along a direction from the second end E2 toward the first end E1 until it reaches the reflective film 4. The reflective film 4 on the first end E1 is configured to reflect the transmitted light T' along the direction substantially opposite to the transmission direction of the incident light I resulting in a second reflected light R2'. The exit light E is a compound light including the first reflected light R1' and the second reflected light R2' and having a second spectrum distribution (see FIG. 5), and emits out from the second end E2. As used herein, the term spectrum distribution refers to a relation between relative intensities of light and various wavelengths over the spectrum. For example, the first spectrum distribution and the second spectrum distribution may have maximum and minimum intensities at different wavelengths.

Referring to FIG. 3, the fiber Bragg grating 6 in the plurality of optical fibers 10 in the compressed state has a pitch P' smaller than the pitch P of the fiber Bragg grating 6 in the plurality of optical fibers 10 in the uncompressed state. As a result, and referring to FIG. 5, a wavelength of the reflected light reflected by the fiber Bragg grating 6 shifts from the first reflection wavelength to a second reflection wavelength different from the first reflection wavelength, upon an application of a pressure F on the first end E1. A spectrum distribution of the compound light emitting out form the second end E2 changes from the first spectrum distribution to a second spectrum distribution different from the first spectrum distribution, upon the application of the pressure F on the first end E1. By detecting spectrum distribution of the exit light, the ridge portion and the valley portion of the fingerprint can be determined, thereby recognizing the fingerprint.

Referring to FIG. 4 and FIG. 5, the second spectrum distribution is different from the first spectrum distribution. Optionally, the incident light is a white light. In the uncompressed state, the first reflected light R1 results from a reflection of a portion of the incident light I by the fiber Bragg grating 6. The transmitted light T continues along the light path until it is reflected by the reflective film 4, thereby generating a second reflected light R2. The compound light including the first reflected light R1 and the second reflected light R2 is not equivalent to the incident light in terms of spectrum distribution. Because the second reflected light R2 travels for an additional length along the optical path as compared to the first reflected light R1, there exists a phase delay between the first reflected light R1 and the second reflected light R2.

In the compressed state, the exit light E' has a spectrum distribution different from that of the incident light I. Moreover, due to the change in the pitch P' as compared to the pitch P in the uncompressed state, the wavelength of the first reflected light reflected by the fiber Bragg grating 6 also changes from a first reflection wavelength to a second reflection wavelength different from the first reflection wavelength. Thus, the first reflected light R1 has a second reflection wavelength different from the first reflection wavelength of the first reflected light R1. This shift in reflection wavelength, in combination with the phase delay of the second reflected light R2', results in a second spectrum distribution different from the first spectrum distribution.

In some embodiments, to facilitate efficient detection of fingerprint, a plurality of fiber Bragg gratings respectively in the plurality of optical fibers have a substantially uniform nominal reflection wavelength when the plurality of fiber Bragg gratings are substantially uncompressed. As used herein, the term "nominal reflection wavelength" refers to the wavelength at which each fiber Bragg grating is designed to reflect light, recognizing that manufacturing imperfections may cause the actual wavelength to vary slightly from the design wavelength. To achieve a substantially uniform nominal reflection wavelength in the plurality of fiber Bragg gratings in the plurality of optical fibers, in some embodiments, the plurality of fiber Bragg gratings respectively in the plurality of optical fibers have a substantially uniform nominal pitch when the plurality of fiber Bragg gratings are substantially uncompressed. As used herein, the term "nominal pitch" refers to the pitch each fiber Bragg grating is designed to have, recognizing that manufacturing imperfections may cause the actual pitch to vary slightly from the design pitch. Consequentially, light exiting from a plurality of second ends of the plurality of optical fibers have a substantially uniform spectrum distribution when the plurality of fiber Bragg gratings are substantially uncompressed.

Figure 6:
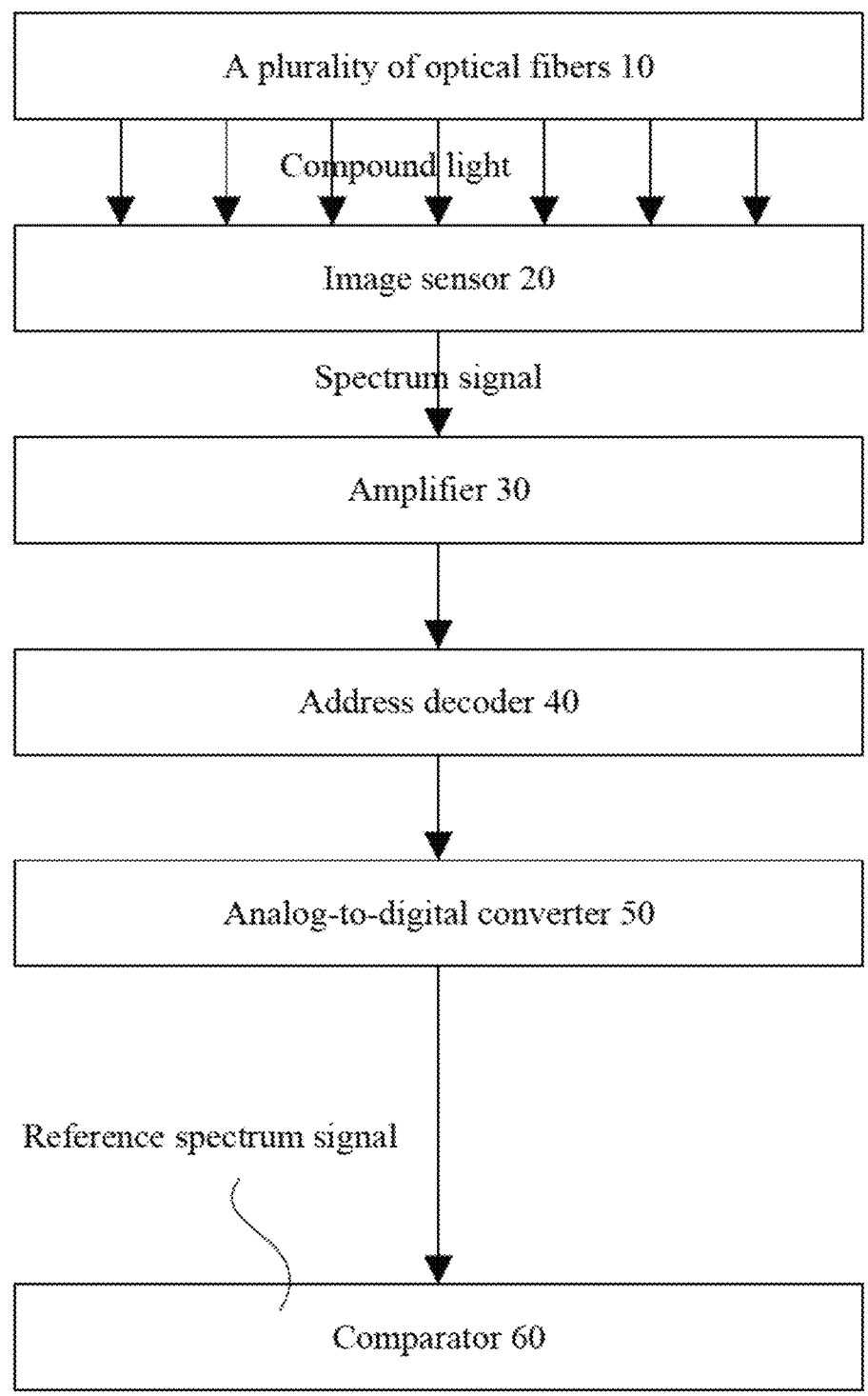
FIG. 6 is a schematic diagram illustrating the structure of a fingerprint sensor in some embodiments according to the present disclosure.

FIG. 6 is a schematic diagram illustrating the structure of a fingerprint sensor in some embodiments according to the present disclosure. Referring to FIG. 6, the fingerprint sensor in some embodiments further includes an image sensor 20 configured to detect the compound light exiting the second ends of the plurality of optical fibers 10, and generate a spectrum signal corresponding to the compound light. Various appropriate image sensors such as a charged coupled device (CCD) image sensor and a complementary metal-oxide semiconductor (CMOS) image sensor may be used for detecting the compound light and generating the spectrum signal corresponding to the compound light detected.

Optionally, the spectrum signal is amplified by an amplifier 30 (e.g., a multiplication circuit or MU circuit). The amplified spectrum signal is then transmitted to an address decoder 40 for decoding an address signal. The spectrum signal is then converted in to a spectrum signal in digital form by an analog-to-digital converter 50. The spectrum signal is transmitted to a comparator 60 and is compared with a reference spectrum signal. The comparator 60 generates a deviation between the spectrum signal and the reference spectrum signal based on the results of comparison. Optionally, the deviation is a deviation between a spectrum distribution of the spectrum signal and a spectrum distribution of the reference spectrum signal. Examples of deviations between the spectrum signal and the reference spectrum signal include a shift in a wavelength having a maximum intensity, a shift in a wavelength having a minimum intensity, a change in gradient of intensity change over the spectrum, and so on.

Optionally, the reference spectrum signal is a signal derived from an exit light from an optical fiber having a substantially uniform nominal pitch of the fiber Bragg gratings when the optical fiber is substantially uncompressed. Optionally, the reference spectrum signal is a signal derived from an exit light from an optical fiber having a substantially uniform nominal pitch of the fiber Bragg gratings when the optical fiber is in a compressed state, e.g., compressed with a reference pressure.

In some embodiments, and referring to FIG. 1, the fingerprint sensor further includes a protective layer 3 covering the first end E1 of each of the plurality of optical fibers 10. Optionally, the protective layer is in direct contact with the first end E1 of each of the plurality of optical fibers 10. Optionally, protective layer is in direct contact with the reflective film 4 in each of the plurality of optical fibers 10.

Various appropriate materials may be used for making the protective layer 3. Optionally, the protective layer 3 is a flexible protective layer, e.g., an elastomer. Examples of appropriate flexible materials for making the protective layer 3 include polyethylene terephthalate, polyimides, polysilicones, polysiloxanes, rubbers, urethane polyimides, polyepoxides, and so on.

Various appropriate materials and various appropriate constructs may be used for making the reflective film 4. Examples of appropriate reflective materials for making the reflective film 4 include various metals having a high reflectivity, e.g., silver, platinum, gold, copper, aluminum, palladium, ruthenium, rhodium, and alloys or laminates thereof.

In some embodiments, the reflective film 4 includes a plurality of sub-layers. Optionally, the reflective film 4 includes at least a first sub-layer and a second sub-layer having different refractive indexes. For example, the reflective film 4 is a Bragg reflector having at least a first sub-layer of a high refractive index and a second sub-layer of a low refractive index. Optionally, the Braga reflector includes a plurality of high refractive index sub-layers and a plurality of low refractive index sub-layers alternately arranged. Optionally, the first sub-layer includes a metal oxide and the second sub-layer includes silicon oxide. Optionally, the first sub-layer includes hafnium oxide and the second sub-layer includes silicon oxide.

In some embodiments, the fingerprint sensor further includes a light source configured to provide the incident light I to each of the plurality of optical fibers 10 from the second end E2. Optionally, the incident light I is a white light, and the light source is a white light source.

Typically, the plurality of ridge lines 1 (or the plurality of valley lines 2) in a fingerprint of an adult have a pitch in a range of approximately 0.3 mm to 0.5 mm, e.g., 0.3 mm. Optionally, each of the plurality of optical fibers 10 has a diameter (when the coating 5 included) in a range of approximately 5 µm to approximately 200 µm, e.g., approximately 5 µm to approximately 175 µm, approximately 5 µm to approximately 150 µm, approximately 5 µm to approximately 125 µm, approximately 5 µm to approximately 100 µm, approximately 5 µm to approximately 75 µm, approximately 5 µm to approximately 50 µm, approximately 5 µm to approximately 2.5 µm, and approximately 5 µm to approximately 20 µm. Optionally, each of the plurality of optical fibers 10 has a diameter (when the coating 5 included) in a range of approximately 25 µm to approximately 75 µm, e.g., approximately 50 µm. Optionally, the array of the plurality of optical fibers 10 has a pitch in a range of approximately 5 µm to approximately 200 µm, e.g., approximately 5 µm to approximately 175 µm, approximately 5 µm to approximately 150 µm, approximately 5 µm to approximately 125 µm, approximately 5 µm to approximately 100 µm, approximately 5 µm to approximately 75 µm approximately 5 µm to approximately 50 µm, approximately 5 µm to approximately 25 µm, and approximately 5 µm to approximately 20 µm. Optionally, the array of the plurality of optical fibers 10 has a pitch in a range of approximately 25 µm to approximately 75 µm, e.g., approximately 50 µm.

In another aspect, the present disclosure provides a display apparatus having the fingerprint sensor described herein. Examples of appropriate display apparatuses include, but are not limited to, an electronic paper, a mobile phone, a tablet computer, a television, a monitor, a notebook computer, a digital album, a GPS, etc. In one example, the display apparatus is a mobile phone. Optionally, the fingerprint sensor is installed as a fingerprint scanner of the display apparatus (e.g., a mobile phone). Optionally, the fingerprint scanner is an in-display scanner.

Optionally, the comparator is integrated into an integrated circuit of the display apparatus.

Figure 7:
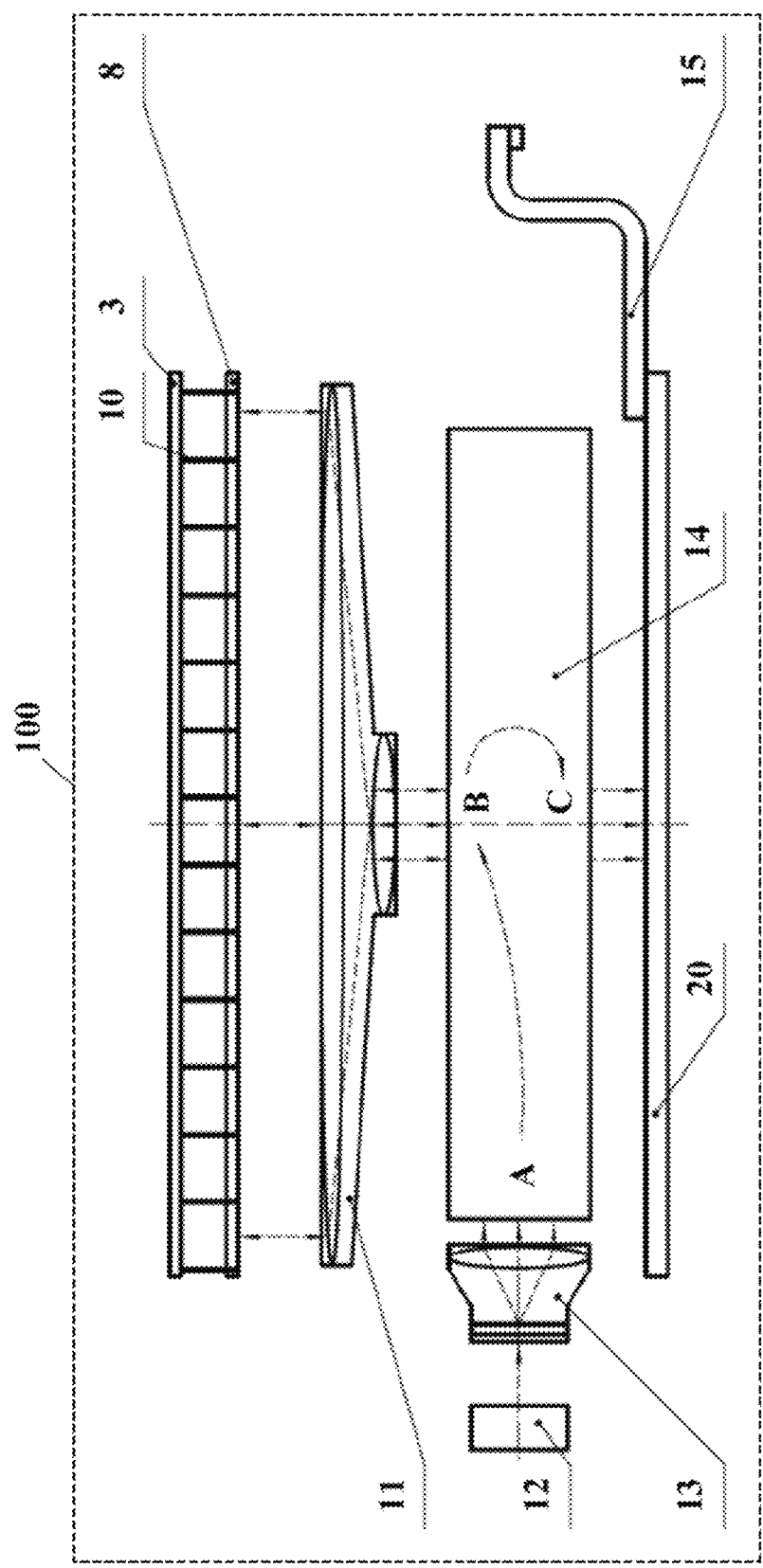
FIG. 7 is a schematic diagram of a fingerprint sensor in some embodiments according to the present disclosure.
Figure 8:
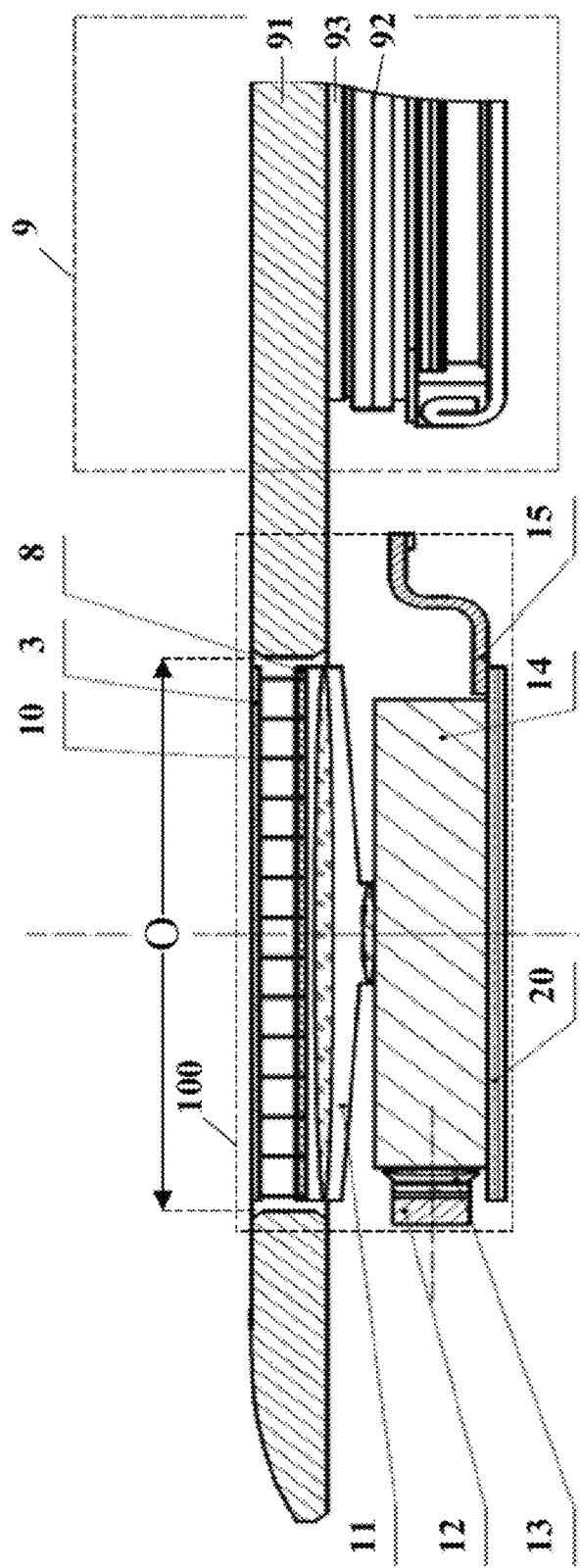
FIG. 8 is a schematic diagram of a partial structure of a display apparatus in some embodiments according to the present disclosure.

FIG. 7 is a schematic diagram of a partial structure of a fingerprint sensor in some embodiments according to the present disclosure. FIG. 8 is a schematic diagram of a partial structure of a display apparatus in some embodiments according to the present disclosure. Referring to FIG. 7 and FIG. 8, the display apparatus in some embodiments includes a fingerprint sensor 100 as an integral part of the display apparatus. The display apparatus includes a display module 9 having a display panel 92 attached to a cover glass 91 through an optical clear adhesive 93. As shown in FIG. 8, the display apparatus has an opening O in the cover glass 91, through which at least a portion of the fingerprint sensor 100 is disposed. Specifically, the plurality of optical fibers 10 are disposed in the opening O for detecting a fingerprint. The fingerprint sensor 100 further includes a light source 12 for emitting a light, e.g., an infrared light. Specifically, the light source 12 in some embodiments is configured to emit an infrared light having a wavelength in a range from 1300 nm to 1500 nm. The light emitted from the light source 12 passes through a light collimator 13 configured to collimate the light emitted from the light source 12 into substantially parallel light. The collimated light then transmits through a circulator 14 into the plurality of optical fibers 10. The plurality of optical fibers 10 in the opening O are disposed so that the incident light from the circulator 14 enters into the second end E2 of each of the plurality of optical fibers 10.

Various appropriate circulators may be used in the present fingerprint sensor. Examples of appropriate circulators include micro-strip circulators, strip-line circulators, waveguide circulators, and lumped circulators. Optionally, the circulator 14 is a micro-strip circulator. Optionally, the circulator 14 is made of a ferrite material. Upon application of a constant magnetic field, light transmission in the circulator 14 is along a uni-directional circulating optical path. Referring to FIG. 7, the collimated light from the light collimator 13 transmits from point A through the uni-directional optical path in the circulator 14 to point B, and emits out of the circulator 14 into the plurality of optical fibers 10.

Various appropriate light collimators may be used in the fingerprint sensor. Examples alight collimators include curved reflective mirrors, and optical lens. In one example, and referring to FIG. 7 and FIG. 8, the light collimator 13 include an assembly of a light diffuser and a convex lens. The light diffuser is configured to diffuse the light from the light source 12. Examples of light diffuser includes a mat-glass placed on the focal plane of the convex lens. The diffused light from the mat-glass is focused by the convex lens into substantially collimated light, and emits into the circulator 14.

In some embodiments, the fingerprint sensor 100 further includes a beam expander 11 configured to expand a diameter of light beam of collimated light from the circulator 14. In one example, the beam expander 11 includes two convex lenses. The first convex lens has a diameter smaller than that of the second convex lens, and focal planes of the first convex lens and the second convex lens substantially overlap. A collimated light from the circulator 14 is expanded by the beam expander 11, and emits out of the beam expander 11 as a collimated light. The expanded collimated light beam is sufficient to cover an entire area of the plurality of optical fibers 10.

The collimated light from the beam expander 11 enters into the second end E2 of each of the plurality of optical fibers 10, and is reflected by the reflective film of each of the plurality of optical fibers 10. The reflected light exits the second end E2 of each of the plurality of optical fibers 10, and enters into the beam expander 11 in a reversed direction. The beam expander 11 functions to reduce the size of the light beam from the plurality of optical fibers 10. The light beam then returns back into the circulator 14 at point B, uni-directionally transmits to point C, and subsequently enters into an image sensor 20. The image sensor 20 is configured to detect the exit light and generate a spectrum signal. Optionally, the image sensor 20 is configured to detect the exit light and generate the spectrum signal corresponding to each of the plurality of optical fibers in a time-division manner.

The spectrum signal generated by the image sensor 20 is transmitted to a driver integrated circuit through a flexible printed circuit 15. The spectrum signal is compared with a reference spectrum signal to generate a deviation between the spectrum signal and the reference spectrum signal, thereby deriving fingerprint information.

In some embodiments, the fingerprint sensor 100 further includes a protective layer 3 covering the first end E1 of each of the plurality of optical fibers. Optionally, the fingerprint sensor 100 further includes a base layer 8 supporting the plurality of optical fibers on the second end E2. Optionally, the base layer 8 is made of silicon oxide. The base layer 8 is configured to filter undesired light from entering into the plurality of optical fibers 10.

In another aspect, the present disclosure provides a method of detecting a fingerprint using a fingerprint sensor described herein. In some embodiments, the method includes detecting the exit light from the second end of each of the plurality of optical fibers and generating a spectrum signal. In some embodiments, prior to detecting the exit light, the method further includes providing an incident light into each of the plurality of optical fibers; reflecting a first portion of an incident light along a direction substantially opposite to a transmission direction of the incident light thereby generating a first reflected light having a first reflection wavelength; allowing a second portion of the incident light to pass through the fiber Bragg grating toward the first end as a transmitted light; reflecting the transmitted light along the direction substantially opposite to the transmission direction of the incident light thereby generating a second reflected light; and mixing the first reflected light and the second reflected light thereby generating the exit light having a first spectrum distribution.

In some embodiments, the method further includes applying a pressure on the first end of one of the plurality of optical fibers. In one example, the pressure is applied by a finger of a user, e.g., the step of applying the pressure is performed by a ridge portion of a finger. A plurality of ridge lines of a fingerprint are in direct contact with one or more of the plurality of optical fibers on the first ends thereof whereas a plurality of valley lines of the fingerprint are not in contact with the plurality of optical fibers. Optionally, the method further includes changing a wavelength of the reflected light reflected by the fiber Bragg grating from the first reflection wavelength to a second reflection wavelength different from the first reflection wavelength upon applying the pressure on the first end; and changing a spectrum distribution of the compound light emitting out form the second end from the first spectrum distribution to a second spectrum distribution different from the first spectrum distribution, upon applying the pressure on the first end.

In some embodiments, the method further includes comparing a spectrum distribution of the exit light with a reference spectrum distribution; and determining a deviation between the spectrum distribution and the reference spectrum distribution. Examples of deviations between the spectrum signal and the reference spectrum signal include a shift in a wavelength having a maximum intensity, a shift in a wavelength having a minimum intensity, a change in gradient of intensity change over the spectrum, and so on.

In some embodiments, the method further includes determining a position corresponding to the exit light exiting a first one of the plurality of optical fibers as a ridge line position of a fingerprint upon determining the deviation is in a first range. Optionally, the method further includes determining a position corresponding to the exit light exiting a second one of the plurality of optical fibers as a valley line position of the fingerprint upon determining the deviation is in a second range different from the first range. Optionally, the reference spectrum distribution is a spectrum distribution of the compound light emitting out form the second end when substantially no external pressure is applied on the first end.

The process can be repeated (simultaneously or in a time-division manner) for the plurality of optical fibers, thereby determining a plurality of ridge line positions (and optionally, a plurality of valley line positions) corresponding to a portion or an entirely of the fingerprint. The ridge portion (and optionally, the valley portion) of the fingerprint can be determined, thereby recognizing a fingerprint.

In another aspect, the present disclosure provides a method of fabricating a fingerprint sensor. In some embodiments, the method includes forming an array of a plurality of optical fibers, each of which is formed to have a first end and a second end opposite to the first end and configured to allow an incident light to enter into the second end and an exit light to exit from the second end. Optionally, the step of forming the plurality of optical fibers includes forming a fiber Bragg grating in a fiber core of each of the plurality of optical fibers; and forming a reflective film on the first end of each of the plurality of optical fibers. Optionally, the step of forming the array of the plurality of optical fibers includes assembling the plurality of optical fibers into a bundle. Optionally, the plurality of optical fibers in the array are aligned relative to each other so that the light paths in the plurality of optical fibers are substantially parallel to each other. Optionally, the plurality of optical fibers in the array are assembled to have a pitch in a range of approximately 5 µm to approximately 200 µm, e.g., approximately 5 µm to approximately 175 µm, approximately 5 µm to approximately 150 µm, approximately 5 µm to approximately 125 µm, approximately 5 µm to approximately 100 µm, approximately 5 µm to approximately 75 µm, approximately 5 µm to approximately 50 µm, approximately 5 µm to approximately 25 µm, and approximately 5 µm to approximately 20 µm. Optionally, the plurality of optical fibers in the array are assembled to have a pitch in a range, of approximately 25 µm to approximately 75 µm, e.g., approximately 50 µm.

Optionally, the plurality of optical fibers are formed so that a plurality of fiber Bragg gratings in the plurality of optical fibers have a substantially uniform nominal pitch and a substantially uniform reflection wavelength with respect to a same incident light, when the plurality of fiber Bragg gratings are substantially uncompressed. Optionally, the plurality of optical fibers are formed so that light exiting from a plurality of second ends of the plurality of optical fibers have a substantially uniform spectrum distribution when the plurality of fiber Bragg gratings are substantially uncompressed.

Optionally, the plurality of optical fibers are formed so that the fiber Bragg grating is configured to reflect a first portion of an incident light along a direction substantially opposite to a transmission direction of the incident light resulting in a first reflected light having a first reflection wavelength, and allow a second portion of the incident light to pass through the fiber Bragg grating toward the first end as a transmitted light. Optionally, the reflective film is formed on the first end to reflect the transmitted light along the direction substantially opposite to the transmission direction of the incident light resulting in a second reflected light. Optionally, the exit light is a compound light comprising the first reflected light and the second reflected light and having a first spectrum distribution, and emits out from the second end.

Optionally, the plurality of optical fibers are formed so that a wavelength of the reflected light reflected by the fiber Bragg grating shifts from the first reflection wavelength to a second reflection wavelength different from the first reflection wavelength, upon an application of a pressure on the first end. Optionally, a spectrum distribution of the compound light emitting out form the second end changes from the first spectrum distribution to a second spectrum distribution different from the first spectrum distribution, upon the application of the pressure on the first end.

Optionally, the method further includes forming an image sensor configured to detect the exit light and generate a spectrum signal. Optionally, the method further includes forming a comparator configured to compare the spectrum signal with a reference spectrum signal thereby generating a deviation between the spectrum signal and the reference spectrum signal.

Optionally, the method further includes forming a protective layer in direct contact with the first end of each of the plurality of optical fibers.

Optionally, the step of forming the reflective film includes forming at least a first sub-layer and a second sub-layer having different refractive indexes. Optionally, the first sub-layer is made of hafnium oxide and the second sub-layer is made of silicon oxide.

Optionally, the method further includes forming a light source configured to provide the incident light to each of the plurality of optical fibers from the second end.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

The invention claimed is:

1. A fingerprint sensor, comprising an array of a plurality of optical fibers;
wherein a respective one of the plurality of optical fibers has a first end and a second end opposite to the first end; and
the respective one of the plurality of optical fibers is configured to allow an incident light to enter into the second end and an exit light to exit from the second end;
wherein the respective one of the plurality of optical fibers comprises:
a fiber core;
a fiber Bragg grating in the fiber core; and
a reflective film on the first end;
wherein the fiber Bragg grating is configured to reflect a first portion of an incident light along a direction substantially opposite to a transmission direction of the incident light resulting in a first reflected light having a first reflection wavelength, and allow a second portion of the incident light to pass through the fiber Bragg grating toward the first end as a transmitted light;
the reflective film on the first end is configured to reflect the transmitted light along the direction substantially opposite to the transmission direction of the incident light resulting in a second reflected light; and
the exit light emitting out from the second end is a compound light comprising the first reflected light and the second reflected light and having a first spectrum distribution.

2. The fingerprint sensor of claim 1, wherein a wavelength of the first reflected light reflected by the fiber Bragg grating shifts from the first reflection wavelength to a second reflection wavelength different from the first reflection wavelength, upon an application of a pressure on the first end; and
a spectrum distribution of the compound light emitting out form the second end changes from the first spectrum distribution to a second spectrum distribution different from the first spectrum distribution, upon the application of the pressure on the first end.

3. The fingerprint sensor of claim 1, wherein a plurality of fiber Bragg gratings respectively in the plurality of optical fibers have a substantially uniform nominal pitch when the plurality of fiber Bragg gratings are substantially uncompressed; and
light exiting from a plurality of second ends of the plurality of optical fibers have a substantially uniform spectrum distribution when the plurality of fiber Bragg gratings are substantially uncompressed.

4. The fingerprint sensor of claim 1, further comprising an image sensor configured to detect the exit light and generate a spectrum signal.

5. The fingerprint sensor of claim 4, further comprising a comparator configured to compare the spectrum signal with a reference spectrum signal thereby generating a deviation between the spectrum signal and the reference spectrum signal.

6. The fingerprint sensor of claim 1, further comprising a protective layer in direct contact with the first end of the respective one of the plurality of optical fibers.

7. The fingerprint sensor of claim 1, wherein the reflective film comprises at least a first sub-layer and a second sub-layer having different refractive indexes.

8. The fingerprint sensor of claim 7, wherein the first sub-layer comprises hafnium oxide and the second sub-layer comprises silicon oxide.

9. The fingerprint sensor of claim 1, further comprising a light source configured to provide the incident light to the respective one of the plurality of optical fibers from the second end.

10. A display apparatus, comprising the fingerprint sensor of claim 1.

11. The display apparatus of claim 10, wherein the fingerprint sensor further comprises:
a light source;
a light collimator configured to collimate light from the light source into substantially collimated light;
a circulator configured to uni-directionally transmit collimated light from the light collimator into the plurality of optical fibers;
an image sensor configured to detect light exit from the plurality of optical fibers, which is uni-directionally transmitted by the circulator to the image sensor, and generate a spectrum signal; and
a printed circuit configured to transmit the spectrum signal to a driver integrated circuit of the display apparatus.

12. The display apparatus of claim 10, further comprising a cover glass and a display panel attached to the cover glass;
wherein the display apparatus has an opening in the cover glass, through which at least a portion of the fingerprint sensor is disposed.

13. A fingerprint sensor, comprising:
an array of a plurality of optical fibers;
a light source;
a light collimator configured to collimate light from the light source into substantially collimated light;
a circulator configured to uni-directionally transmit collimated light from the light collimator into the plurality of optical fibers; and
an image sensor configured to detect light exit from the plurality of optical fibers, which is uni-directionally transmitted by the circulator to the image sensor, and generate a spectrum signal;
wherein a respective one of the plurality of optical fibers has a first end and a second end opposite to the first end; and
the respective one of the plurality of optical fibers is configured to allow an incident light to enter into the second end and an exit light to exit from the second end;
wherein the respective one of the plurality of optical fibers comprises:
a fiber core;
a fiber Bragg grating in the fiber core; and
a reflective film on the first end.

14. A method of detecting a fingerprint using a fingerprint sensor comprising an array of a plurality of optical fibers;
wherein a respective one of the plurality of optical fibers has a first end and a second end opposite to the first end; and
is configured to allow an incident light to enter into the second end and an exit light to exit from the second end;
wherein the respective one of the plurality of optical fibers comprises:
a fiber core;
a fiber Bragg grating in the fiber core; and
a reflective film on the first end;
the method comprising:
detecting the exit light from the second end of the respective one of the plurality of optical fibers and generating a spectrum signal;
wherein, prior to detecting the exit light, the method further comprises:
providing an incident light into the respective one of the plurality of optical fibers;
reflecting a first portion of an incident light along a direction substantially opposite to a transmission direction of the incident light thereby generating a first reflected light having a first reflection wavelength;
allowing a second portion of the incident light to pass through the fiber Bragg grating toward the first end as a transmitted light;
reflecting the transmitted light along the direction substantially opposite to the transmission direction of the incident light thereby generating a second reflected light; and
mixing the first reflected light and the second reflected light thereby generating the exit light having a first spectrum distribution.

15. The method of claim 14, further comprising applying a pressure on the first end of one of the plurality of optical fibers;
changing a wavelength of the first reflected light reflected by the fiber Bragg grating from the first reflection wavelength to a second reflection wavelength different from the first reflection wavelength upon applying the pressure on the first end; and
changing a spectrum distribution of the exit light emitting out from the second end from the first spectrum distribution to a second spectrum distribution different from the first spectrum distribution, upon applying the pressure on the first end.

16. The method of claim 14, further comprising comparing a spectrum distribution of the exit light with a reference spectrum distribution; and
determining a deviation between the spectrum distribution and the reference spectrum distribution.

17. The method of claim 14, further comprising:
determining a position corresponding to the exit light exiting a first one of the plurality of optical fibers as a ridge line position of a fingerprint upon determining the deviation is in a first range; and
determining a position corresponding to the exit light exiting a second one of the plurality of optical fibers as a valley line position of the fingerprint upon determining the deviation is in a second range different from the first range.

* * * * *